United States Patent [19]

Sharp et al.

[11] 4,029,728

[45] June 14, 1977

[54] METHOD OF INJECTION MOULDING PALLETS

[75] Inventors: Herbert John Sharp, Greenford; Rudolf Drucker, London; Edward Droar; Syed Mujahid Ali Zaidi, both of Harrow, all of England

[73] Assignee: GKN Sankey Limited, Bilston

[22] Filed: Jan. 6, 1976

[21] Appl. No.: 646,822

Related U.S. Application Data

[63] Continuation-in-part of Ser. No. 472,017, May 12, 1974, abandoned.

[52] U.S. Cl. .............................. 264/278; 264/275; 264/277; 264/328
[51] Int. Cl.² .................................. B29D 3/02
[58] Field of Search .......... 108/51.1; 264/275, 277, 264/278, 328

[56] References Cited

UNITED STATES PATENTS

| 2,040,921 | 5/1936 | Corbin | 264/328 |
| 2,356,585 | 8/1944 | Hempel | 264/328 X |
| 2,465,799 | 3/1949 | Gravesen | 264/328 X |
| 3,311,690 | 3/1967 | Fischer | 264/278 |
| 3,787,549 | 1/1974 | Stanley | 264/278 X |

FOREIGN PATENTS OR APPLICATIONS

| 2,517,604 | 11/1975 | Germany | 264/278 |
| 1,131,612 | 1968 | United Kingdom | 264/328 X |

Primary Examiner—Richard R. Kucia
Attorney, Agent, or Firm—Sughrue, Rothwell, Mion, Zinn & Macpeak

[57] ABSTRACT

A method of injection moulding a pallet comprising a reinforcement or reinforcing frame provided with an encapsulation of thermoplastic polymeric material, wherein the reinforcement is held in an open mould cavity by vertical projections before the mould cavity is closed and after closure of the cavity is supported in the cavity by horizontal projections whereupon said material is injected into the cavity to encapsulate the reinforcement, the projections subsequently being withdrawn the cavity opened and the pallet removed. The reinforcement or reinforcing frame of the pallet is in the form of two interconnected assemblies of crossed rods.

5 Claims, 14 Drawing Figures

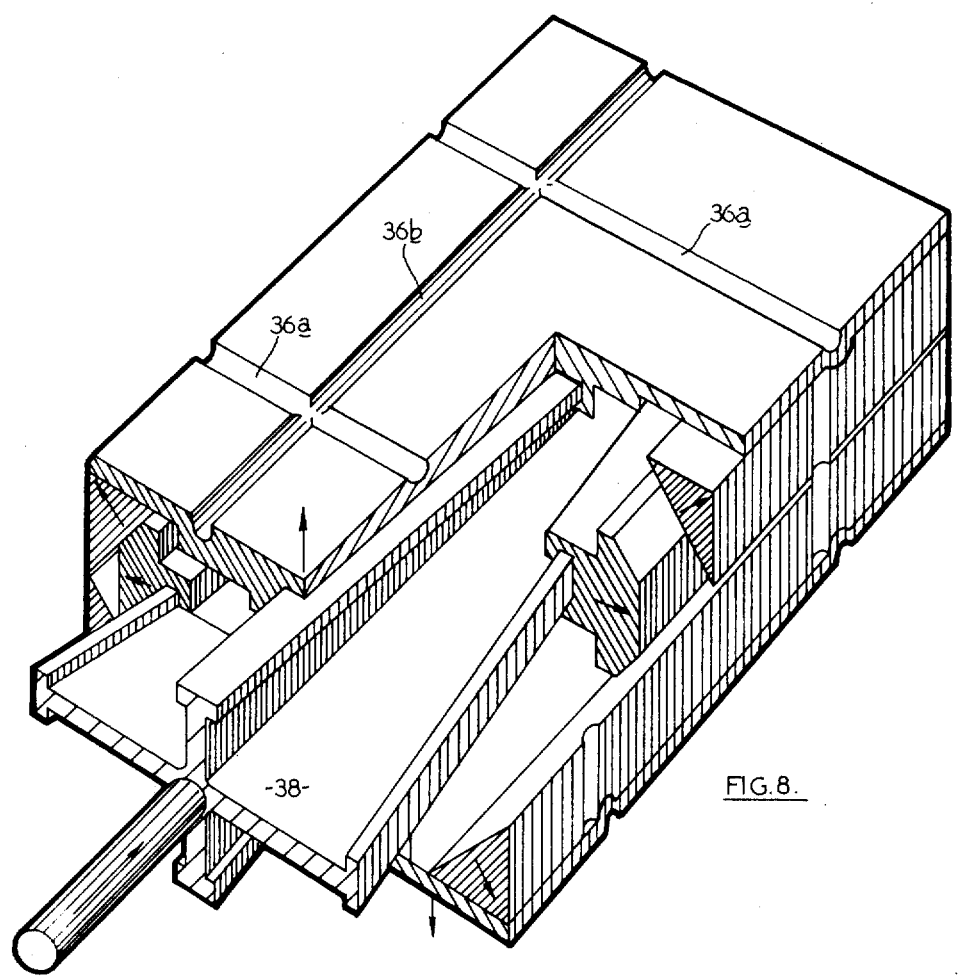

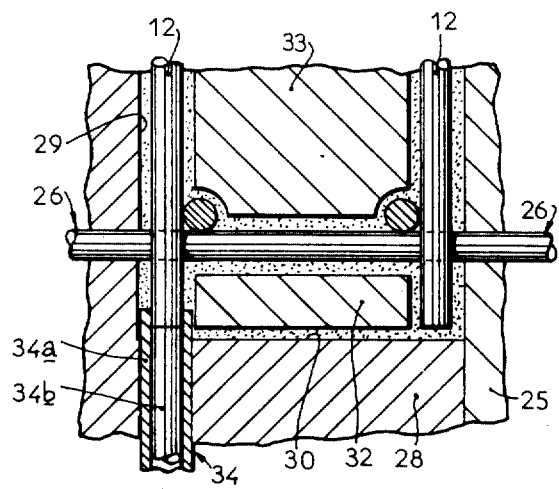
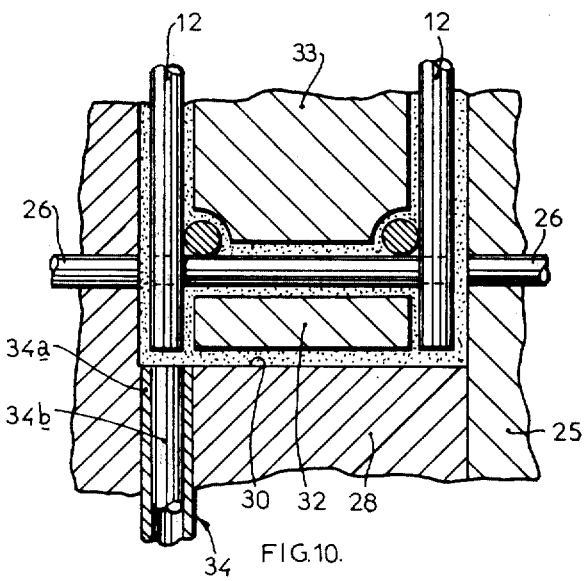

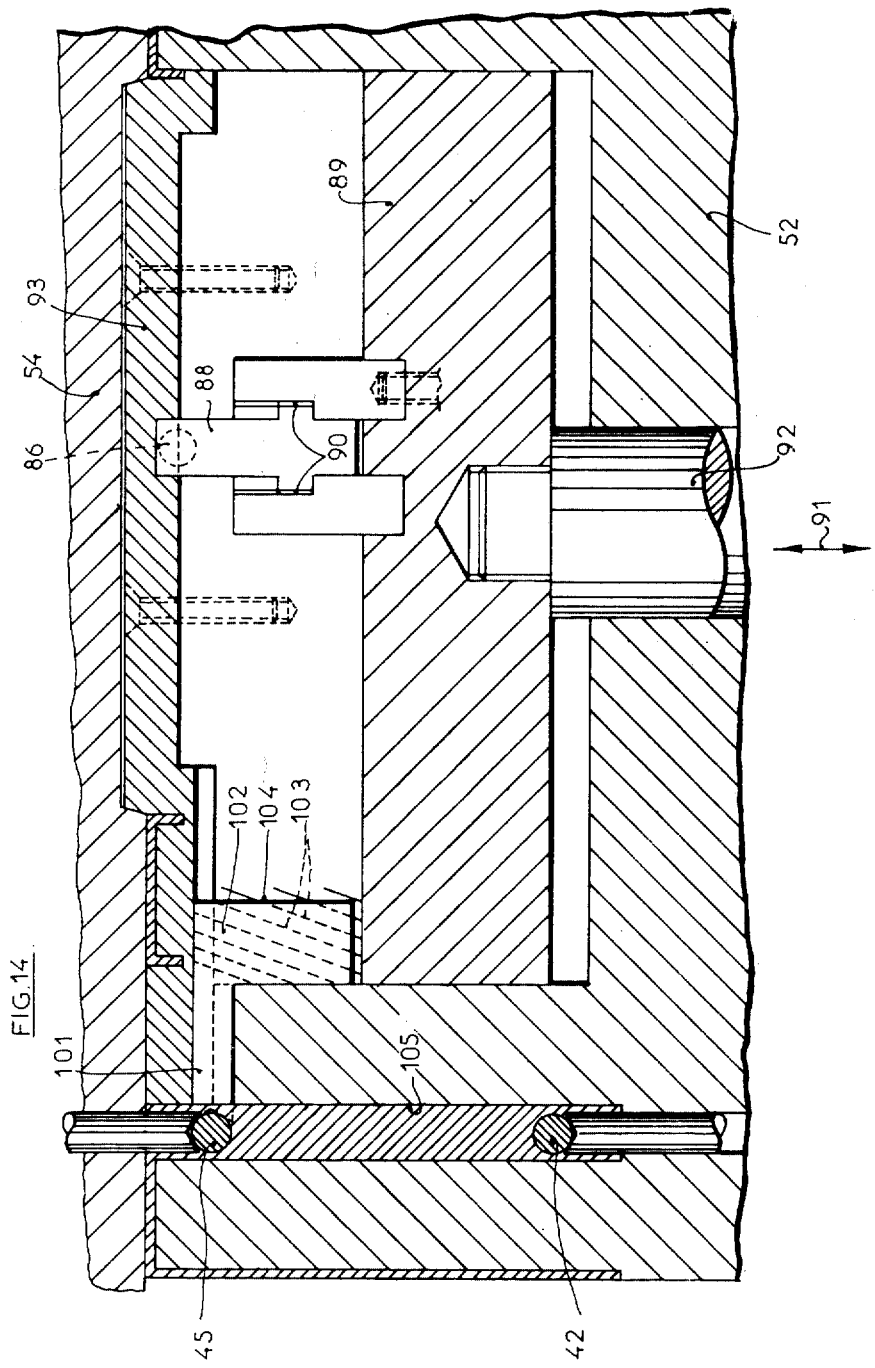

METHOD OF INJECTION MOULDING PALLETS

REFERENCE TO RELATED APPLICATION

This is a continuation-in-part of patent application Ser. No. 472,017 filed May 12, 1974, now abandoned.

BACKGROUND OF THE INVENTION

FIELD OF THE INVENTION

This invention relates to a method of injection moulding a pallet comprising a reinforcing frame provided with an encapsulation of thermoplastic polymeric material.

In the moulding of pallets large horizontal injection moulding machines may be used and, since the reinforcing frame extends over substantially the whole area of the faces of the pallet, the frame has to be held against considerable forces during injection. In a horizontal injection moulding machine the platens which carry the mould parts move towards and away from one another in horizontal directions between open and closed positions.

When injection moulding a reinforced pallet in such a machine it is necessary to hold the reinforcing frame against movement in the mould cavity at least during the initial stages of moulding. It is preferred to hold the frame with projections which extend horizontally and which prevent movement of the frame during moulding. On the other hand, since the frame has to be held in or on one of the mould parts before the mould is closed, the horizontal projections which are desirable for holding the frame in the cavity during moulding cannot be used to hold the frame initially before the mould is closed.

SUMMARY OF THE INVENTION

According to the invention, therefore, we provide a method of producing a reinforced plastic article comprising the steps of: forming at least two assemblies having high strength crossed rods which are joined at their crossing points, connecting said assemblies in spaced generally parallel relationship by a plurality of cross members to form a reinforcing frame, providing an injection mould having a first wall structure defining a cavity and a second wall structure defining a closing member, locating said frame within the cavity of said first wall structure, extending a plurality of first projections from opposed portions of said first wall structure into engagement with said frame to position said frame in spaced relationship to said first wall structure, moving said second wall structure into engagement with said first wall structure to close said cavity, extending a plurality of second projections from opposed portions of said first and second wall structures into engagement with said frame to hold said frame in said position and in spaced relationship with said second wall structure, injecting fluent thermoplastic polymeric material under pressure into said cavity to fill the space between said frame and said first and second wall structures and substantially encapsulate said frame, withdrawing said first and second projections so that said thermoplastic material flows into the voids created by the withdrawal of said projections thus completing the encapsulation of said frame by said material, causing said material to solidify, moving said second wall structure away from said first wall structure to open said cavity, and removing said article from said cavity.

The frame is thus held in the cavity by the first projections and when the cavity is closed by the closing member the second projections hold the frame firmly in the desired location.

The invention also includes a method of injection moulding a pallet having a reinforcing frame which includes at least two assemblies having vertical and horizontal rods connected at their crossing points and said assemblies being connected together in spaced generally parallel relationship by a plurality of cross members, the method of injection moulding comprising the steps of: placing said frame within the walls of an open mould cavity, extending a plurality of first projections into said open cavity to engage at least two of said rods to locate said frame within said cavity and in spaced relationship with said cavity walls, closing said mould cavity, extending a plurality of opposed second projections horizontally into said closed cavity into engagement with said frame to hold said frame in said location, injecting thermoplastic polymeric material under pressure into said closed cavity to fill the cavity and thus substantially to encapsulate said frame with said material, withdrawing from said first and second projections so that said plastics material flows into the voids created by the withdrawal of said projections thus completing the encapsulation of said frame by said material causing said material to solidify opening said mould cavity, and removing said pallet.

It will be seen that this method overcomes the above problem since the frame is held in the open mould cavity by the first mentioned projections before the mould cavity is closed and then, when the mould cavity has been closed, the frame is engaged and held by the horizontal projections. Since there are high pressures in the mould cavity of the order of 7,000 to 10,000 psi the reinforcement has to be held firmly in the mould cavity.

As will be described in more detail below, suitable thermoplastic polymeric materials for use in the invention method are high density polyethylene copolymers and polypropylene copolymers.

The projections are withdrawn at such a stage in the injection cycle that the voids left by the withdrawn projections are filled by the thermoplastic polymeric material, hereinafter referred to as plastic material. The plastics material will be compressed during injection and may thus expand to fill the voids when the projections are withdrawn without any further plastics material having to be supplied to the mould cavity.

Movable cores, may be moved into position within the mould cavity before injection takes place thus resulting in the formation of a hollow body of the pallet during moulding, the core or cores being withdrawn from the mould cavity before withdrawal of the pallet.

The or each core may be collapsible so that each core may be moved into and out of the cavity in its collapsed condition and expanded when in position in the mould cavity and prior to injection.

The open mould cavity may have a peripheral wall and the method may be carried out by causing the vertical projections to extend from the peripheral wall.

Each of said first mentioned projections may be vertical and comprise an outer sleeve and inner pin which are movable relative to one another, the method being carried out so that the frame is initially located by being engaged within the outer sleeves of the projections and located therein by the inner pins and so that, when the vertical projections are withdrawn, the free ends of the outer sleeves and inner pins are flush with the wall of the mould cavity.

Alternatively the first mentioned projections may be caused to engage between two adjacent parts or rods of the frame to locate the latter in the cavity.

BRIEF DESCRIPTION OF THE DRAWINGS

The invention will now be described in detail by way of example with reference to the accompanying drawings in which:

FIGS. 6, 7 and 8 illustrate the principle of operation of the collapsible side cores used in the mould shown in FIGS. 4 and 5;

FIGS. 9 and 10 illustrate the construction and operation of the projections of the mould shown in FIGS. 4 and 5 and which hold the reinforcing frame in the one mould part before the mould is closed.

FIGS. 13 and 14 are sections through a mould for making the pallet shown in FIG. 12.

DESCRIPTION OF THE PREFERRED EMBODIMENTS

Figure 1:
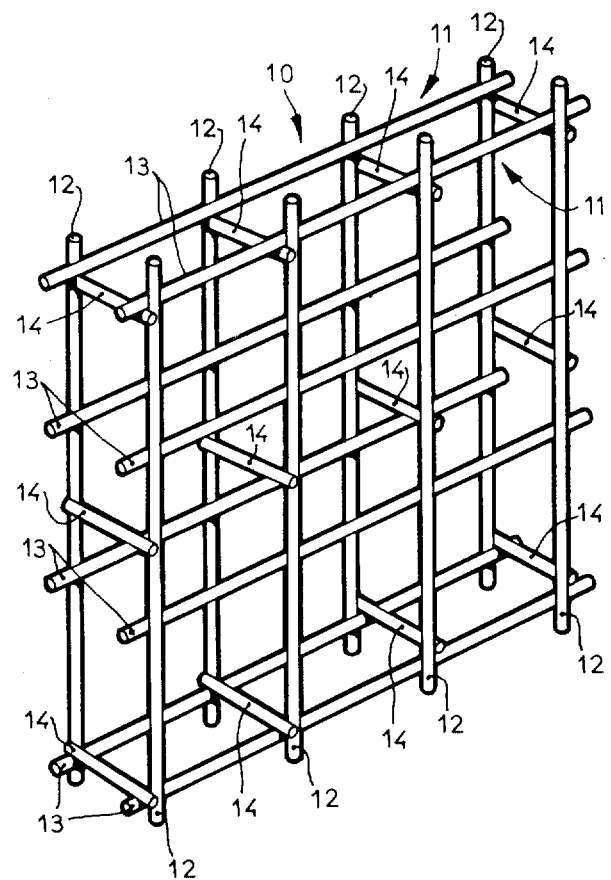
FIG. 1 is a perspective view of a reinforcing frame used in the manufacture of a pallet by a first method in accordance with the invention.

Referring first to FIG. 1, the reinforcing frame there shown is made of rigid metal rods and comprises two similar assemblies. The metal rods are preferably made of mild steel but alloy steels may be used if greater strength is required than can be obtained with mild steel. The frame is indicated generally at 10 and comprises two assemblies 11, each assembly comprising a number of parallel rods 12 which are crossed by, and secured at their crossing points to, a number of parallel rods 13; the rods 12 are vertical and the rods 13 are horizontal. At their crossing points the rods 12 and 13 are welded together and it will be noted that the rods 12 in one assembly are aligned with the rods 12 in the other assembly and the rods 13 in one assembly are aligned with the rods 13 in the other assembly. The assemblies are held in spaced relation by further short rods or cross members 14 which are welded in position, the ends of the rods 14 adjacent to the crossing points of the rods 12 and 13.

Figure 2:
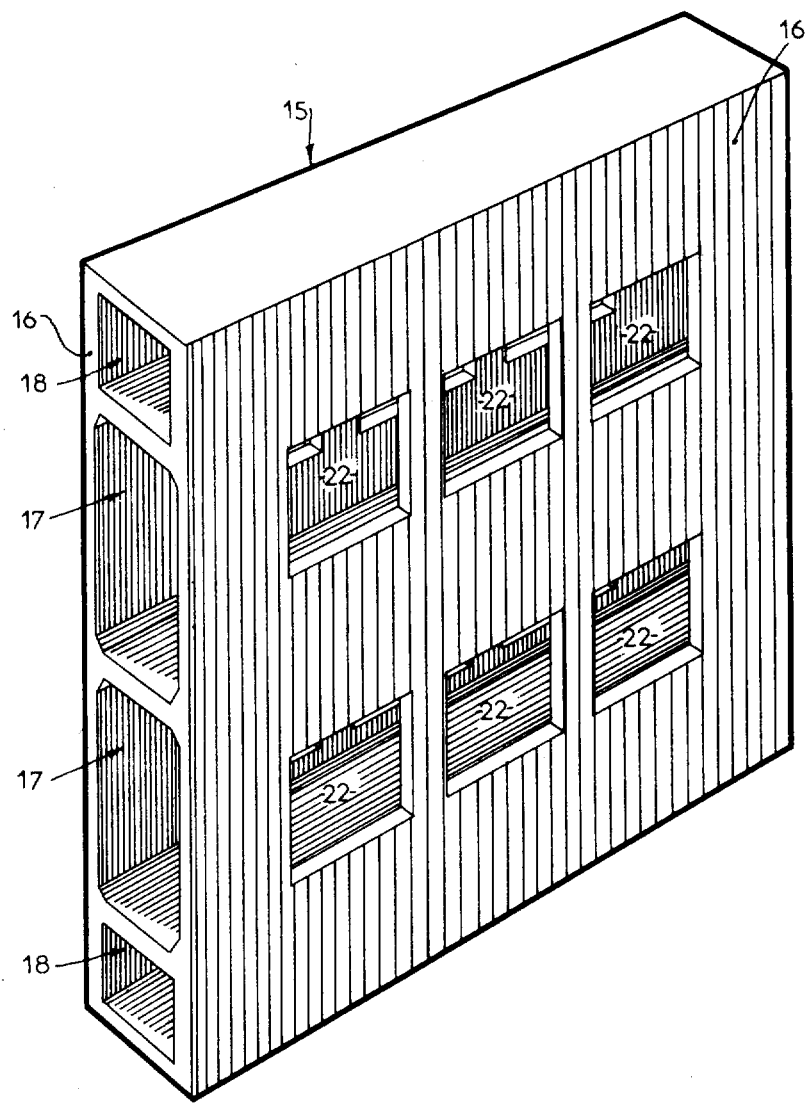
FIG. 2 is a perspective view of the completed pallet made by said first method.
Figure 3:
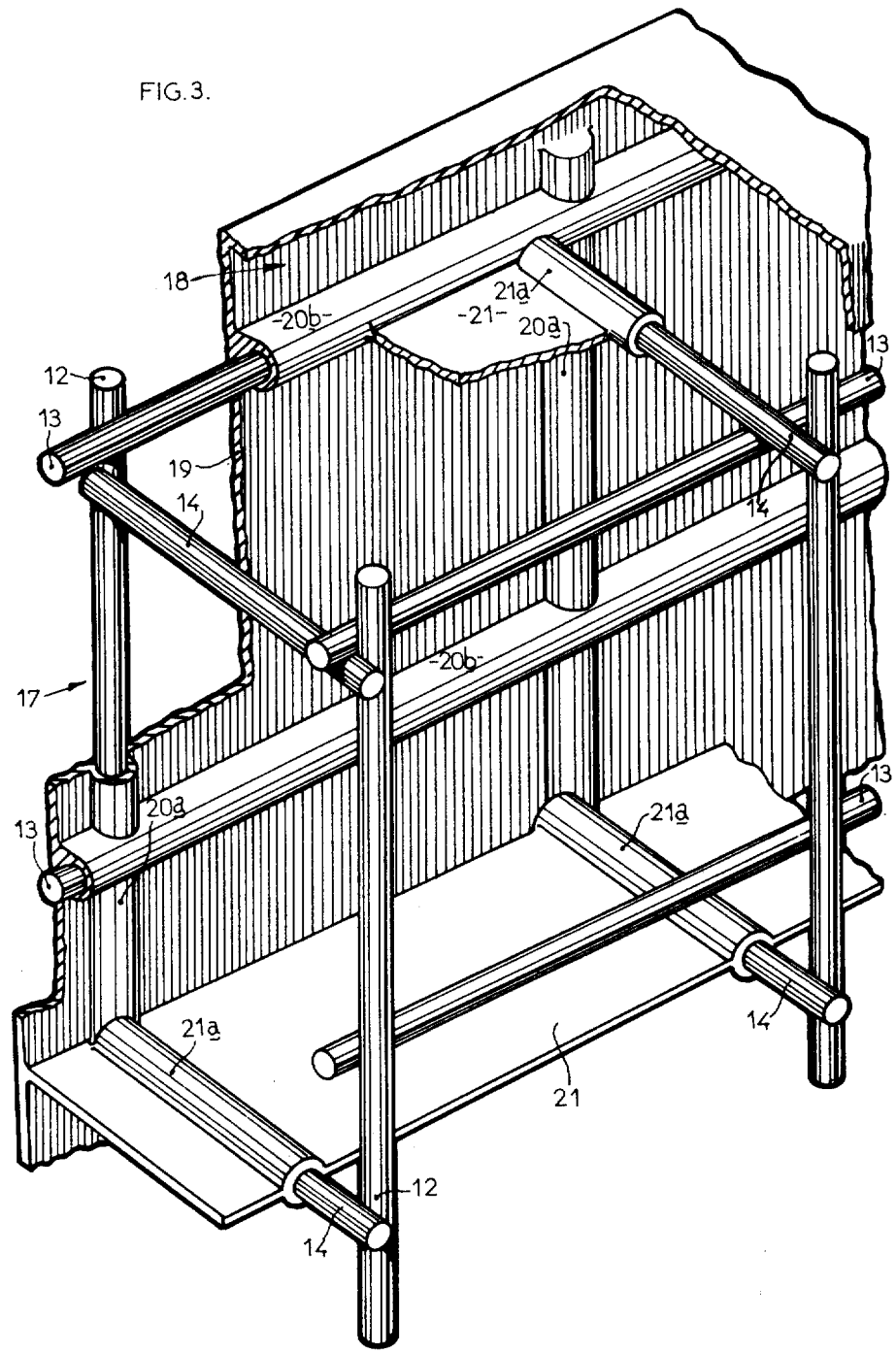
FIG. 3 is a detail perspective view of the pallet of FIG. 2 showing the plastics material covering the reinforcing frame.

The finished pallet is shown in FIGS. 2 and 3 and is indicated generally at 15. The pallet has opposed decks 16 which comprise wall structure and which are spaced apart to define a hollow body and there are larger openings or recesses 17 between the decks to receive fork tines of a pallet or fork lift truck and smaller openings or recesses 18 provided for lightness. As will be seen from FIG. 3, the deck 16 comprises a panel 19 of plastics material which has ribs 20a thereon which encase the rods 12 and ribs 20b which encase the rods 13 and thus connects the rods 12 and 13 of an assembly 11. Extending between the two decks 16 are webs 21 which have ribs 21a which encase the rods 14. As shown in FIG. 2, each deck may be provided with openings 22 through which the pallet can drain and through which may project the wheels of the pallet truck in a known manner.

Figure 4:
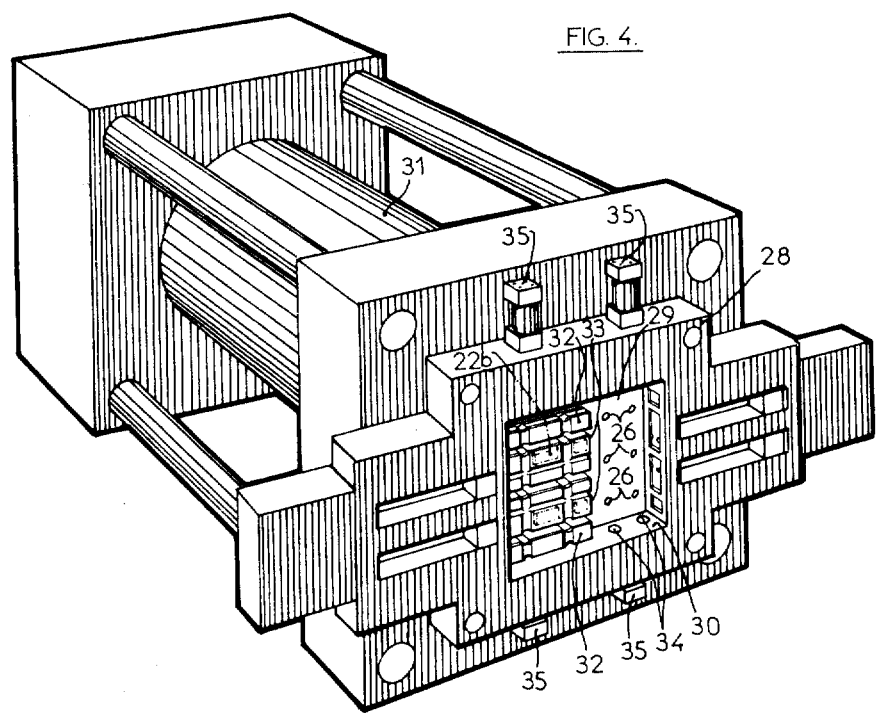
FIGS. 4 and 5 are perspective views of the parts of a horizontal injection moulding machine and mould for making the pallet of FIG. 2.

Referring to FIGS. 4 and 10 these illustrate a moulding machine and mould suitable for making the pallet previously described.

Figure 5:
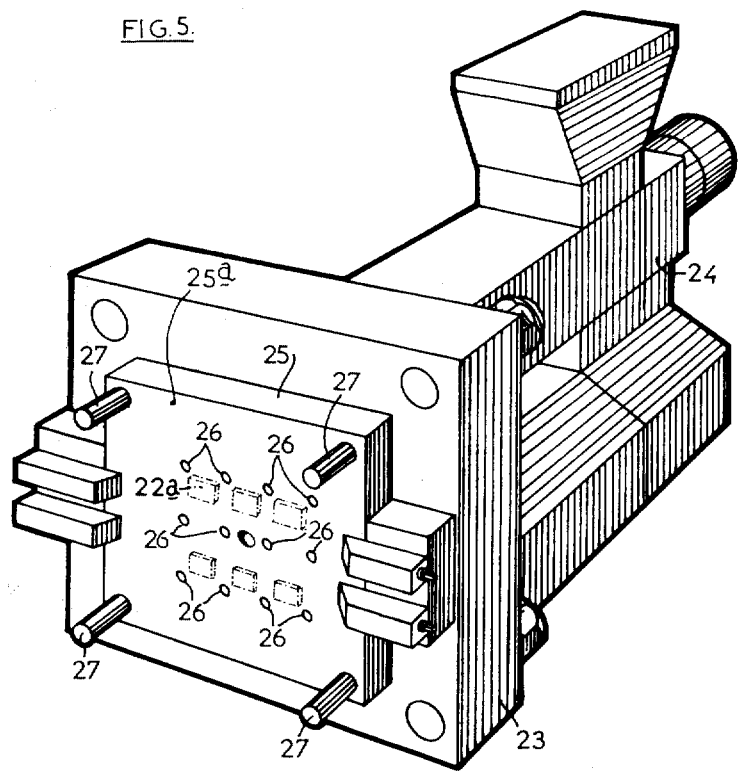

Referring to FIGS. 4 and 5, these show a conventional horizontal injection moulding machine carrying mould parts which are movable towards and away from one another on a horizontal axis although shown at an angle in these two figures for clarity The moulding machine comprises a fixed platen 23 associated with a plasticising and injection mechanism 24. The fixed platen 23 carries a mould part 25 in the form of a generally flat plate. Mounted in the mould plate to project therefrom are horizontal projections 26 which are shown in their retracted positions in which their free ends are flush with the face 25a of the part 25. Locating dowels 27 are carried by the mould part 25.

The movable mould part is indicated at 28 and comprises a face 29 surrounded by a peripheral wall 30 thus to form an open mould recess or cavity. The part 28 has a number of horizontal projections 26 similar to the projections 26 associated with the mould part 25 and which, when retracted, have their free ends flush with the face 29. The mould part 28 is movable towards and away from the mould part 25 by means of a hydraulic ram 31. This mould part 28 carries side cores 32 and 33. The side cores 33 are arranged to form the openings or recesss 17 and the side cores 32 are arranged to form the openings or recesses 18. The side cores 32 and 33 are collapsible as will be described in relation to FIGS. 6 and 8 and can serve not only to form the openings or recesses 17 but also the openings 22. The side cores are shown in their projected positions on the left in FIG. 4 and in their retracted positions on the right. Each of the upper and lower parts of the peripheral wall 30 is furnished with four vertical projections 34, of which two are shown, adjacent to the face 29, the projections being shown in their withdrawal positions.

The projections 34 are illustrated in detail in FIGS. 9 and 10 and are operated by mechanism including fluid cylinders 35. Each projection 34 comprises an outer sleeve 34a and an inner pin 34b. When a projection is withdrawn as shown in FIG. 10 the free ends of the sleeve and pin are flush with the peripheral wall 30. When the projection is extended both the sleeves 34a and the pin 34b stand proud of the surface 30 but the sleeve projects further than the pin as shown in FIG. 9 whereby the end of a rod 12 may be located in the projection. The projections 34 in the upper and lower parts of the wall 30 are in alignment.

Figure 6:
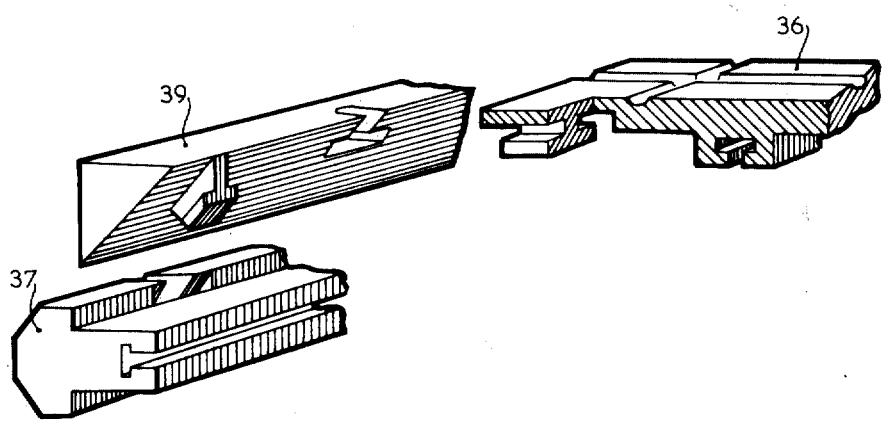
Figure 7:
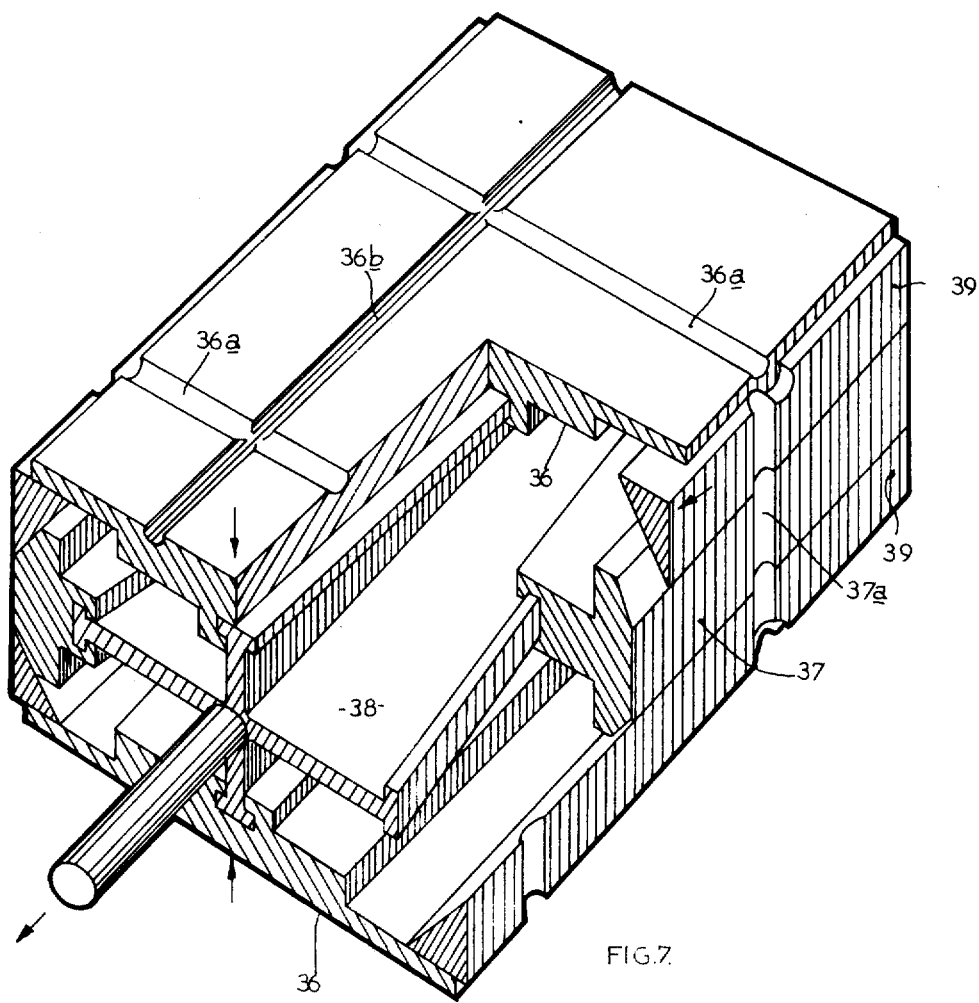

The side cores 32 and 33 are shown in detail in FIGS. 6 to 8 and each comprise two opposed parts 36 and two opposed parts 37. The parts 36 can be moved apart by means of a wedge member 38 as can the parts 37, the wedge member 38 having connections with the parts 36 and 37. The parts 36 have grooves 36a and 36b to receive the rods 12 and 13 respectively and the parts 37 have grooves 37a to receive the rods 14. Filling blocks 39 keyed to the parts 36 and 37 fill the spaces between the latter when the core is expanded as clearly shown in FIG. 7.

The method of moulding the pallet is as follows. The reinforcing frame 10 is placed in the open mould cavity in the movable mould part 28 with the side cores 32 and 33 retracted. The upper and lower ends of the rods 12 nearer to the face 29 are engaged by the vertical projections 34 which are projected and thus locate the frame in position in spaced relation to the walls of the cavity. The side cores 32 and 33 are then moved to their extended positions within the frame but in their collapsed state as shown in FIG. 8 and the wedge members 38 are then operated to expand the cores to the positions shown in FIG. 7. The movable mould part 28 is then brought into engagement with the fixed mould part 25 while guided by the dowels 27 thus to close the mould cavity. The mould parts are then locked together. The horizontal projections 26 are then projected to hold the reinforcing frame in the desired position in which it has been located by the projections 34. Plastics material is now injected under high pressure into the mould cavity to form the desired encapsulation on the frame 10. Towards the end of the injection cycle, the projections 26 and 34 are withdrawn so that the voids left by the withdrawal of the projections are filled with the injected material. The use of expansible cores 32 and 33 with grooves therein enables an encapsulation of substantially equal thickness to be obtained over the reinforcing frame as is clear from FIG. 3. When the plastics material has solidified, the side cores 32 and 33 are collapsed and are then withdrawn. The mould is then opened and the finished pallet removed.

One suitable plastics material for carrying out the invention is a high density polyethylene copolymer having a melt flow index, as measured under the conditions of ASTM test D1238 of 0.3 g./10 minutes and a density of 0.948 g./ml as measured by ASTM test D1501. The material is injected into the mould cavity at a temperature of about 280° C in three stages. The first stage, which lasts for 5 seconds, fills the major part e.g. 90% of the volume of the mould cavity. The injection pressure, i.e. the pressure in the injection cylinder of the mechanism 24, is 1300 kg/cm$^2$ during this first stage.

In the second stage, which also lasts for 5 seconds, the mould cavity is completely filled, the pressure in the injection cylinder in the mechanism 24 being 900 kg/cm$^2$. The projections 26 and 34 are withdrawn during this stage and the plastics material, which has been compressed in the mould cavity by the high injection pressures, expands to fill the voids left by the withdrawal of the projections.

During these two stages, therefore, the mould cavity is filled and the reinforcing frame is encapsulated by the plastics material. At the end of the first stage the reinforcing frame is supported by the plastics material in such a manner that it will not move substantially in the mould cavity when the projections are withdrawn in the second stage. The viscosity of the plastics material will prevent substantial movement of the frame in the mould cavity.

In the third stage, which lasts 30 seconds, the material in the cavity is maintained under pressure, the pressure in the injection cylinder being 700 kg/cm$^2$, during initial solidification. When the plastics material in the mould gate or gates has solidified the injection pressure is removed. The moulding is then cooled for 60 seconds to a temperature below 120° C. The cooling is effected by passing cooling water through cooling passages P in the mould parts as shown in FIGS. 9 and 10.

After cooling the side cores 32 and 33 are withdrawn and then the mould cavity is opened and the pellet ejected. The internal faces of the mould are highly polished to prevent the plastics material from adhering to the mould faces which are also given a slight taper or draw to enable the pallet to be withdrawn from the cavity without difficulty. These features of the mould construction are conventional. We find that the temperature of the internal faces of the mould when it is opened between moulding cycles is of the order of 70° C.

Another thermoplastic polymeric material which may be used in carrying out the invention is a polypropylene copolymer having a melt flow index measured according to the ASTM test No. D1238 of 1.8 g./10 minutes. The moulding conditions are similar to those above described except that the material will be injected at a temperature of 300° C and during and after the third stage the cooling will be down to a temperature of 120° C.

With the foregoing examples those skilled in the art will appreciate the type of plastics material which may be used in carrying out the invention and the injection conditions applicable.

It is noted that the thermoplastic polymeric material does not adhere to either the rods of the reinforcing frame or to the mould, however, such material is in intimate engagement with the rods and completely encapsulates the same so that the thermoplastic material protects the rods from the elements and the rods impart strength to the thermoplastic material.

If the openings 22 are required these may be provided in various ways. Thus in one method, the mould part 25 and the mould surface 29 may be provided with pads indicated in FIG. 5 on the mould part 25 at 22a which are equal in thickness to the parts 19 of the decks 16. These pads are arranged to co-operate with the side cores 33 to form the openings 22. Any flash which may occur between these pads and the side cores 33 may be trimmed out after moulding to form the openings.

Alternatively, the side cores 33 themselves may be provided with pads such as indicated at 22b in the left hand part of FIG. 4 in chain dotted lines. In this case any flash between the pads 22b and the surface of the mould parts 25 or the surface 29 may be removed after moulding.

In a still further arrangement, both pads such as 22a and 22b may be provided so that the pads come into engagement when the mould parts are closed and any flash formed between the pads will be trimmed out after moulding.

In a modification of the invention, instead of the rods being covered by the plastics materials which form ribs 20a on the undersides of the decks, the ribs may be provided on the exposed surface of the decks and there may be ribs of plastics material extending parallel to the rods 13 so as to form a grid effect on the surface.

Figure 11:
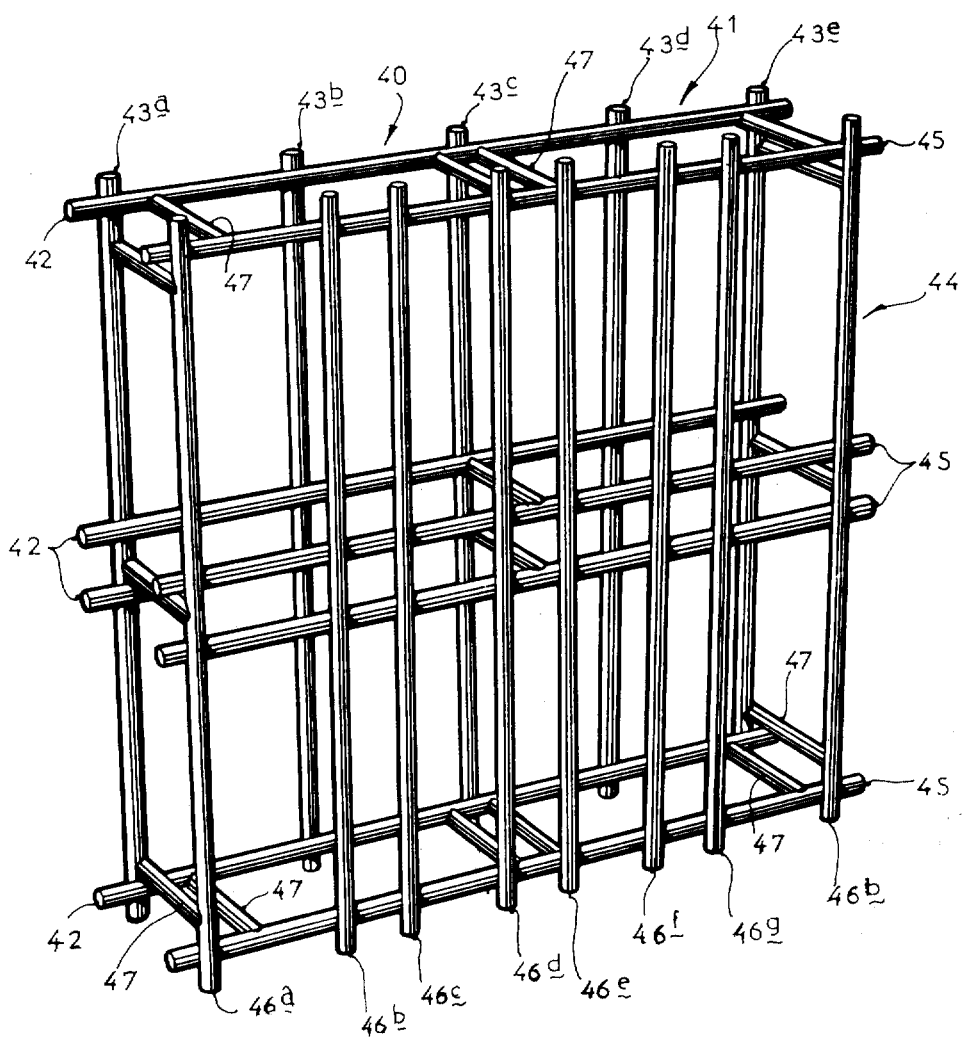
FIG. 11 is a perspective view of a reinforcing frame used in the manufacture of a pallet by a second method embodying the invention.

Referring now to FIG. 11, this shows a reinforcing frame for making a pallet constituting a second embodiment of the invention. The frame is indicated generally at 40 and comprises a first assembly 41 comprising four horizontal rods 42 which are crossed by, and welded at their crossing points to, five vertical rods 43. The frame 40 comprises a second assembly indicated at 44 which includes four horizontal rods 45 which are aligned with the rods 42 and eight vertical rods 46 which, except for the end rods, are staggered relative to the vertical rods 43. The frame is intended for making a non-reversible pallet, the load bearing deck being reinforced by the rods 45 and 46 and the base of the pallet being reinforced by the rods 42 and 43. The two assemblies are secured together in spaced relation by a number of transverse rods or cross members 47 which are welded in position. All the rods may be of mild steel or alloy steel as referred to above.

Figure 12:
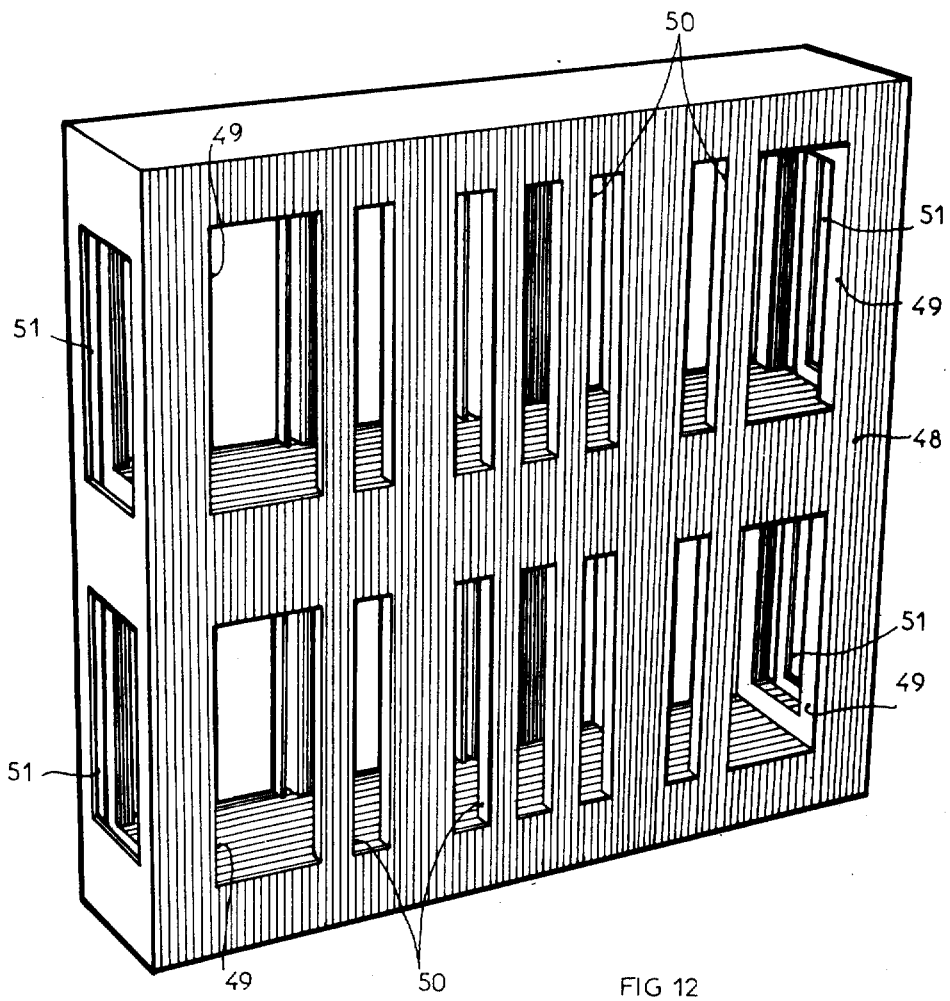
FIG. 12 is a perspective view of the completed pallet made by said second method.

The finished pallet is shown in FIG. 12 and has a hollow body; the load-bearing deck is indicated at 48 and has therein a plurality of openings. There are larger openings 49 at the corners and smaller openings, some of which are indicated at 50 between the openings 49. The openings 49 occur between the end rods 46 and the next adjacent rods while the five openings 50 are between the six central rods 46. Openings are provided between the two assemblies 41 and 44, such openings being indicated at 51 and are for receiving fork tines whereby the pallet can be lifted. The openings 51 are provided by side cores in a manner similar to the manner in which the openings 17 and 18 in the pallet of FIG. 2 are provided.

Figure 13:
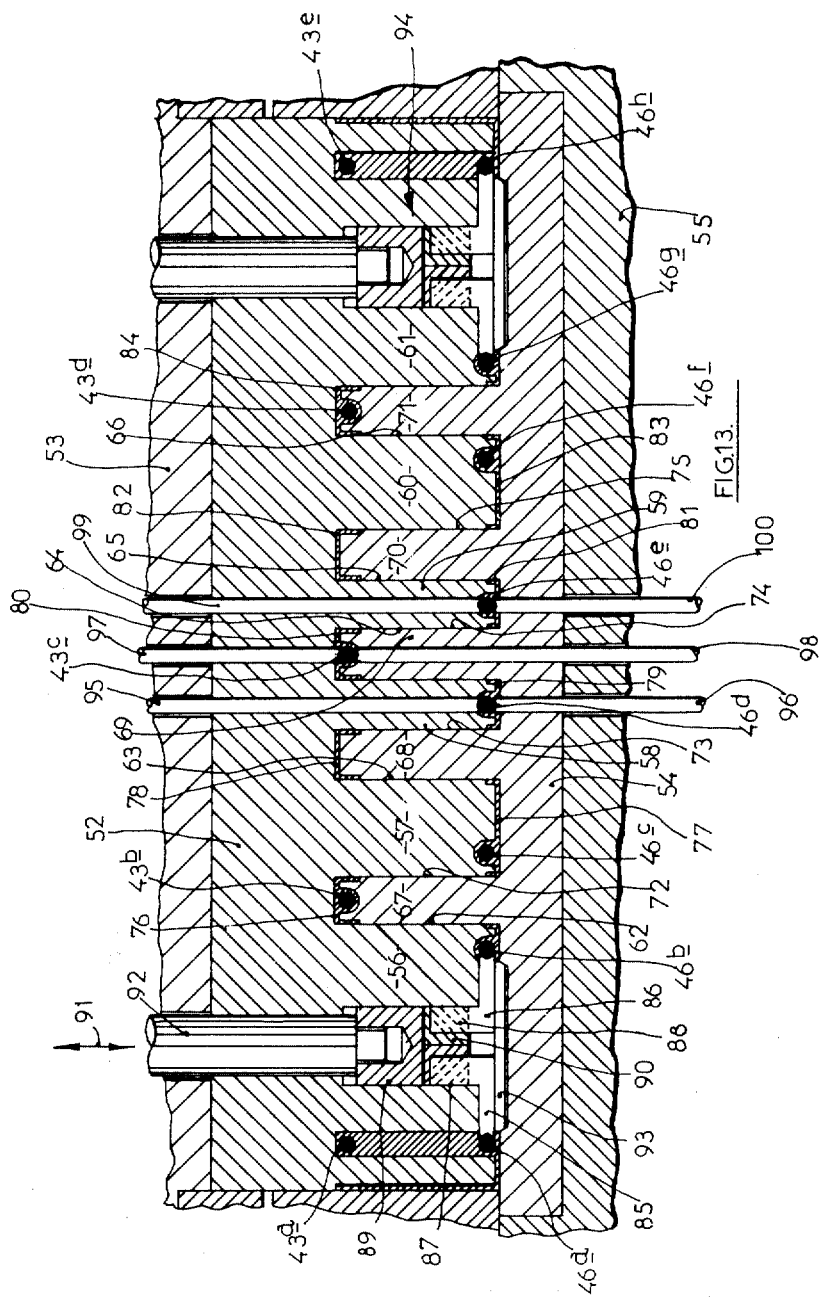

Referring to FIG. 13, this shows a section through a mould for making the pallet of FIG. 2 with the frame 40 in position and with the plastics material having been moulded around the frame. The various rods 46 are indicated at 46a to 46h and the rods 43 have similarly been referred to as 43a to 43e respectively as identified also in FIG. 11.

There is a first mould part 52 which is carried by a platen 53 and a second mould part 54 which is carried by a platen 55. The mould parts 52 and 54 interfit, but the mould part 52 has projections 56, 57, 58, 59, 60 and 61 which between them define recesses 62 to 66 in which are received projections 67 to 71 respectively on the mould part 54. Between each adjacent pair of the projections 67 to 71 there is a recess in which is received one of the projections 57 to 60. Thus the projection 57 is received in a recess 72, the projection 58 is received in a recess 73, the projection 59 is received in a recess 74 and the projection 60 is received in a recess 75.

Considering first the centre part of the mould cavity, parts thereof are formed between the ends of the projections 57 to 60 to 71 and the bases of their associated recesses 62 to 66 and 72 to 75 respectively. Thus taking, for example, the projection 67 and the recess 62, there is formed a portion of a mould cavity which is indicated at 76 as full of plastics material and in which is located the rod 43b. Similarly there is a portion 77 of the cavity between the end of the projection 57 and the base of the recess 72, the mould cavity part containing the rod 46c. There is a portion 78 of the mould cavity between the end of the projection 68 and the base of the recess 63. There is a portion of the projection 68 and the base of the recess 63. There is a portion 79 of the mould cavity between the end of the projection 58 and the base of the recess 73 and this portion of the mould cavity contains the rod 46d. There is a portion of the mould cavity 80 between the end of the projection 69 and the base of the recess 64 and this contains the rod 43c. There is a portion of the mould cavity 81 between the end of the projection 59 and the base of the recess 74 and this contains the rod 46a. There is a part of the mould cavity 82 between the end of the projection 70 and the base of the recess 65. There is a portion 83 of the mould cavity between the end of the projection 60 and the base of the recess 75 and this contains the rod 46f. There is a portion of the mould cavity 84 between the end of the projection 71 and the base of the recess 66 and this contains the rod 43d. It will be noted that the openings 50 are provided by the projections 67 to 71.

The projections 56 and 61 contain movable projections for locating the frame 40 in the open mould cavity prior to closing of the mould. Referring by way of example to the left hand side of FIG. 13, there are two cylindrical projections 85 and 86 shown in FIG. 13. The ends of the projections 85 and 86 are shaped to engage and locate the rods 46a and 46b. At their inner ends, the projections 85 and 86 have tongues 87 and 88 respectively which have teeth thereon which are inclined to the longitudinal axes of the projections 85 and 86. The tongues 87 and 88 are mounted in an apertured block 89 which also is provided with two sets of inclined teeth indicated generally at 90 and is movable in the direction of the arrow 91 by means of a rod 92 which is connected to a hydraulic cylinder, not shown. As the rod 92 is moved in the direction of the arrow 91 the projections 85 and 86 will be moved towards and away from one another. When they are moved away from one another they will engage between, and grip the rods 46a and 46b. The apertured block 90 carries a cover plate 93 which engages in an aligned recess in the mould part 54 so as to provide one of the openings 49 in the moulded pallet.

A similar arrangement is provided at each corner of the mould so as to provide the openings 49 and so that the frame may be gripped at each corner. Thus on one side the frame will be gripped between the rods 46a and 46b and on the other side the frame will be gripped between the rods 46g and 46h. The assembly for gripping the rods 46g and 46h is substantially identical to that described in relation to the left hand side of FIG. 13 and is indicated generally at 94.

When the mould is closed, as will be described below, the various rods 43 and 46 are held by projections which extend horixontally from opposed faces of the mould parts. Such projections are shown for the rods 43c, 46d and 46e. Similar projections are provided for the other rods but are out of the section taken in FIG. 13. Thus the projections for the rod 46d are indicated at 95 and 96, those for the rod 43c at 97 and 98 and those for the rod 46e at 99 and 100.

Referring to FIG. 14, this shows a section through the assembly of the projections 85 and 86 and their operating means. It will be seen that the projections 85 and 86 are associated with a further projection 101 which has its longitudinal axis horizontal and which at its inner end has a tongue 102 having inclined teeth 103. The apertured block 89 has further inclined teeth 104 which engage with the inclined teeth 103 so that as the block 89 is moved by the rod 92 in the directions of the arrows 91 the projection 101 extends into a portion of the mould cavity 105 and can engage one of the rods 45 as shown. The projection 101 associated with a pair of projections such as 85 and 86 assists in locating the frame in a predetermined position on the mould part 52 while the mould cavity is open.

The method of moulding the pallet takes place as follows. With the mould cavity open and the mould parts spaced apart the frame 40 is placed on the mould part 52 and is located thereon by extending the projections 85, 86 and 101 and the similar projections at the other corners of the reinforcing frame. It will be seen that the frame will be fully located on the mould part since the projections 85 and 86 will extend between the rods 46a and 46b on the one hand and between the rods 46g and 46h on the other hand. Moreover the projections such as 101 will engage the upper and lower rods 45. The mould cavity is now closed by moving the mould parts horizontally relative to one another with the reinforcing frame 40 correctly located within the mould cavity. The various rods 43 and 46 will now be located by means of movable horizontal projections extending from opposed faces of the mould parts similar to the projections 95 to 100 shown in FIG. 13 for the rods 46d, 43c and 46e respectively. Plastics material will now be injected into the mould cavity to fill the latter and the various parts of the mould cavity described in FIG. 13 will be filled and the rods will be completely encapsulated. At a stage during the moulding similar to that described above in relation to FIGS. 1 to 10 the projections such as 85, 86, 101 and 95 and 100 will be withdrawn. It will be possible to withdraw the projections such as 85, 86 and 101 once the mould cavity has been closed and the projections such as 95 to 100 extended and before moulding takes place. Alternatively all the projections can be withdrawn simultaneously but the projections will be withdrawn at such a time as to enable the plastic material to fill the voids left by withdrawal of the projections so that the reinforcing frame is completely encapsulated in plastics material.

The plastics material will in fact be compressed during injection and will expand as the projections are withdrawn to fill the cavities. The moulding process and conditions and the plastics materials which may be used ae exactly as described above in relation to FIGS. 1 to 10.

It will be appreciated that the mould parts 52 and 54 and the platens 53 and 55 are mounted on a horizontal moulding machine in a manner similar to that described in relation to FIGS. 4 and 5 for the mould parts 25 and 28 and that therefore FIG. 13 is a horizontal section through the mould parts and FIG. 14 is a vertical section. The mould parts also contain passages P1 for cooling water similar to the passages P in FIGS. 9 and 10.

We claim:

1. A method of injection moulding a pallet having a reinforcing frame which includes at least two assemblies having vertical and horizontal rods connected at their crossing points and said assemblies being connected together in spaced generally parallel relationship by a plurality of cross members, the method of injection moulding comprising the steps of; placing said frame within the walls of an open mould cavity, extending a plurality of first projections into said open cavity to engage at least two of said rods to hold said frame within said cavity and in spaced relationship with said cavity walls, closing said mould cavity, extending a pluralirty of opposed second projections horizontally into said closed cavity into engagement with said frame to hold said frame in said location, injecting thermoplastic polymeric material under pressure into said closed cavity to fill the cavity and thus substantially to encapsulate said frame with said material, withdrawing said first and second projections so that said plastics material flows into the voids created by the withdrawal of said projections thus completing the encapsulation of said frame by said material, causing said material to solidify, opening said mould cavity and removing said pallet.

2. A method according to claim 1 including the further steps of moving one or more collapsible cores into said closed mould cavity in their collapsed condition, expanding the cores before injection takes place to form at least one recess in the pallet during moulding to provide a hollow body and collapsing and withdrawing the cores from the mould cavity before withdrawal of the moulded pallet.

3. A method according to claim 1 wherein each of said first mentioned projections is vertical and comprises an outer sleeve and an inner pin which are movable relative to one another, the method including the steps of locating said frame in said open mould cavity by engaging rods of the frame within said outer sleeves and locating the rods in said sleeves by said inner pins and, after injection, withdrawing said vertical projections so that the free ends of said outer sleeves and said inner pins are flush with an internal surface of the mould cavity.

4. A method according to claim 1 including locating said frame in said open mould cavity by engaging said first mentioned projections between adjacent rods of the frame.

5. The method of producing a reinforced plastic article comprising the steps of: forming at least two assemblies having high strength crossed rods which are joined at their crossing points, connecting said assemblies in spaced generally parallel relationship by a plurality of cross members to form a reinforcing frame, providing an injection mould having a first wall structure defining a cavity and a second wall structure defining a closing member, locating said frame within the cavity of said first wall structure, extending a plurality of first projections from opposed portions of said first wall structure into engagement with said frame to position said frame in spaced relationship to said first wall structure, moving said second wall structure into engagement with said first wall structure to close said activity, extending a plurality of second projections from opposed portions of said first and second wall structures into engagement with said frame to hold said frame in said position and in spaced relationship with said second wall structure, injecting fluent thermoplastic polymeric material under pressure into said cavity to fill the space between said frame and said first and second wall structures and substantially encapsulate said frame, withdrawing said first and second projections so that said thermoplastic material flows into the voids created by the withdrawal of said projections thus completing the encapsulation of said frame by said material, causing said material to solidify, moving said second wall structure away from said first wall structure to open said cavity, and removing said article from said cavity.

* * * * *